Aug. 24, 1937.　　　　N. TITLESTAD　　　　2,090,921
CONTROL OF THE FLOW RATIO OF A LIQUID AND A GAS
Filed Dec. 2, 1929
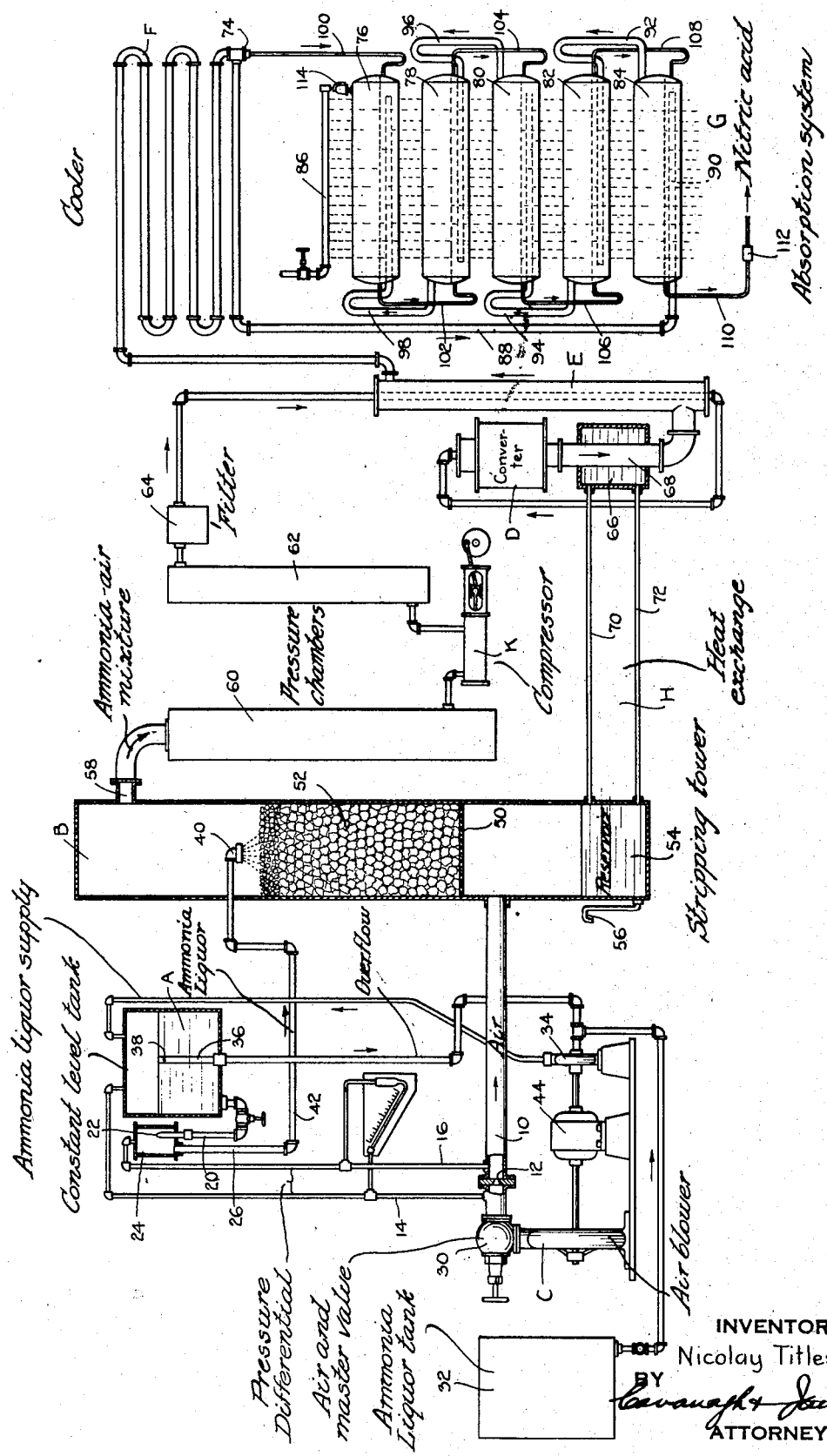
INVENTOR
Nicolay Titlestad
BY
Cavanagh & Somers
ATTORNEYS

UNITED STATES PATENT OFFICE 2,090,921

CONTROL OF THE FLOW RATIO OF A LIQUID AND A GAS

Nicolay Titlestad, Charlotte, N. C., assignor, by mesne assignments, to Chemical Construction Corporation, Charlotte, N. C., a corporation of Delaware Application December 2, 1929, Serial No. 411,019

22 Claims. (Cl. 23—162)

This invention relates to the control of the flow ratio of a liquid and a gas, and more particularly to ammonia liquor and air preparatory to ammonia oxidation by catalytic conversion in the manufacture of nitric acid.

The primary object of the present invention resides in the provision of a method and means for automatically controlling the ratio of the rates of flow of a gas and a liquid, which is done generally by obtaining a pressure differential dependent upon the rate of flow of the gas, and utilizing the said pressure differential to vary the flow of the liquid. More specifically, both fluids are passed separately through orifices and the pressure differential across the gas flow orifice is applied to and causes a flow of liquid through the liquid flow orifice, so that the rate of flow of liquid is automatically kept at a value commensurate with the rate of flow of gas.

In the example herein disclosed, the invention is applied specifically to the manufacture of nitric acid. This may be obtained by a process consisting generally of removing ammonia from ammonia liquor by a current of air, and oxidizing the ammonia or causing reaction of the mixture of ammonia and air in a catalytic converter, after which the oxidized ammonia may be absorbed to form nitric acid of a desired concentration.

To strip ammonia from the ammonia liquor it has been found desirable to cause the ammonia liquor to flow downwardly through a stripping tower and to blow a current of air upwardly through the stripping tower, and at the same time to apply heat to the stripping tower. Great difficulty is experienced in the event of variation in one or more of the factors involved, such as the rates of flow of air and liquor, and the heat applied to the stripping tower. In order to overcome some of these difficulties, and to simplify the successful practice of the process, there is disclosed in copending applications of Ingenuin Hechenbleikner and the present applicant, Ser. No. 192,462, filed May 18, 1927, now Patent 1,748,646 issued Feb. 25, 1930 and a divisional application thereof, Ser. No. 352,095, filed April 3, 1929, now Patent 1,898,775 issued Feb. 21, 1933, A method and means for automatically controlling the heat applied to the stripping tower in accordance with the strength of the reaction gases reaching the converter.

In oxidizing ammonia it is essential for obtaining the maximum yield that there be no variation in the gas composition from some optimum value, say 9 or 10 percent strength. Consequently, in the event of variation of the ratio of ammonia liquor to air, which may frequently be caused by simple factors such as a drop in the voltage or frequency of the electrical power supply to the plant, the optimum gas strength is departed from and the efficiency of the process is reduced. In more extreme cases the strength of the gas may be increased to a point such that the resulting increase in reaction temperature in the converter may seriously damage the catalyst of the converter.

Aside from the problem of unintentional changes in flow, there frequently arises the problem of intentional changes intended to control the rate of manufacture. For example, when niter is supplied to a chamber plant it is necessary that the supply be variable in accordance with the needs of the plant. Heretofore when such a change in rate of manufacture was to be made it was necessary to regulate the amount of ammonia, to change the amount of air to that necessary under the new conditions, and to guard against over-heating of the catalyst, particularly during the transition period, and to manually and experimentally harmonize all these various factors was difficult and required a number of hours of time.

One object of the present invention is to overcome the foregoing difficulties and to provide automatic regulation of the ratio of ammonia liquor and air so as to make it possible to control the rate of manufacture of nitric acid simply by a single control such as regulation of the amount of air supplied to the stripping tower. This regulation is obtained in accordance with the method previously suggested, the air and ammonia liquor being separately passed through orifices and the pressure differential across the air flow orifice being utilized to cause a flow of the ammonia liquor through the liquid flow orifice, thereby keeping the rates of flow in proportion.

A further object of the present invention is to generally improve the method and apparatus used for the manufacture of nitric acid by ammonia oxidation, to which end the distillation of ammonia from the ammonia liquor is conducted under reduced pressure while the catalytic conversion and the absorption of the oxidized gas is conducted under increased pressure, and during the gas absorption the gas is cooled in several stages and finally passed through a water cooled multiple drum absorption system, all while under pressure.

To the accomplishment of the foregoing and such other objects as will hereinafter appear, my invention consists in the method and the apparatus elements and their relation one to the other as hereinafter are more particularly described in the specification and sought to be defined in the claims. The specification is accompanied by a drawing, the single figure of which is a flow diagram for a preferred form of apparatus embodying my invention.

Referring to the drawing, the apparatus consists generally of a source of aqua ammonia or ammonia liquor A, a stripping tower B through which ammonia liquor is allowed to trickle downwardly, a source of air represented by the blower C, a stream of air from which is blown upwardly through the stripping tower B, where it removes ammonia from the ammonia liquor. The resulting mixture of ammonia and air is passed through a catalytic converter D, where the ammonia is oxidized by the air and the oxidized ammonia is cooled in the heat exchanger E, air cooled pipes F, and finally is further cooled and absorbed to form nitric acid in a multiple drum absorption system G. A part of the heat of reaction of the catalytic conversion may be transferred through the thermal system H to the stripping tower B, thereby aiding in the distillation of ammonia from the ammonia liquor. The pressure in the stripping tower B may be reduced to further aid in the distillation of ammonia, and the pressure in the converter D and the cooling stages E and F and absorption stage G, may be increased to aid in the absorption of the nitric acid, by a compressor K, preferably located as shown between the stripping tower and the converter.

It is exceedingly important in the operation of such an ammonia oxidation plant that the gas fed to the converter be of constant composition, and preferably of an optimum composition, say 9 or 10 percent strength of NH₃, for maximum yield. In order to obtain this desired gas composition it is necessary that the quantities of ammonia liquor, air, and heat supplied to the stripping tower be kept in proper proportion. To adjust these various factors manually is tedious and consumes a number of hours. This condition is undesirable even when the variations to be compensated for are only accidental, and is particularly inconvenient in case the rate of manufacture is designed to be variable as, for example, if the apparatus is used to supply niter to a chamber plant.

Aside from the desire for efficient operation and yield of the apparatus, proper regulation of the factors involved is essential in order to prevent actual damage to the apparatus, and particularly to the catalyst, such as platinum, in the converter. For example, if the heat applied to the stripping tower is increased the distillation of ammonia is greatly accelerated, and the gas fed to the converter is strengthened, thereby increasing the heat of reaction and leading to the possibility of burning out or damaging the catalyst itself. If the air supply is decreased or the supply of ammonia liquor is increased, the same result will occur. In the copending applications previously referred to, an arrangement is disclosed which makes possible the automatic regulation of the heat supplied to the stripping tower, with a view to keeping the converter temperature constant. This control of one of the factors greatly simplifies the operation of the apparatus, but still leaves open the problem of the control of the ratio of the ammonia liquor and the air supplied to the stripping tower.

In accordance with the present invention, the ratio of the rates of flow of the ammonia liquor and air is automatically kept at a constant and predetermined desired value. The apparatus for the control, or more broadly, for the control of the ratio of the rates of flow of any liquid and any gas will next be described.

The gas flow is conducted through any suitable gas flow conduit 10. In this conduit means, here exemplified by the orifice plate 12, is provided to obtain a pressure differential dependent upon the rate of flow of gas through conduit 10. It will be understood, of course, that in place of the orifice 12 a Venturi constriction or Pitot tubes might equally well be employed.

The liquid is contained in a source A, which preferably is a constant level tank, and flows therefrom through any suitable conduit 20, in which a suitable orifice nozzle or constriction is located as at 22. The orifice 22 is preferably located at the same level as the liquid in level tank A. The orifice 22 may be surrounded by a suitable chamber 24 into which liquid flowing through the orifice is discharged. Such liquid then flows to a discharge or drain pipe 26, from which it may be utilized as desired.

Now, in accordance with the present invention, the pressure differential obtained across gas flow orifice 12 is utilized to cause a flow of liquid through the liquid flow orifice 22, or more specifically, the pressures before and after the gas flow orifice 12 are applied through pipes 14 and 16 respectively, to the level tank A and the discharge chamber 24. In the absence of flow of gas in conduit 10 the pressures in pipes 14 and 16 are equalized and nozzle 22 being at the same level as the liquid in level tank A, no liquid flows through nozzle 22. Upon flow of gas through conduit 10, the pressure in pipe 16 is diminished relative to the pressure in pipe 14, and this pressure differential on either side of orifice 22 causes a flow of liquid therethrough and down the pipe 26. Inasmuch as the flow of a liquid through an orifice follows the same laws as the flow of a gas through an orifice, the liquid flow may be kept proportional to the gas flow entirely automatically.

As specifically applied to the ammonia oxidation equipment here disclosed, air may be fed to stripping tower B through conduit 10, from a blower C, and the quantity of air may be regulated by a valve 30. This single valve serves to control the rate of ammonia oxidation and the rate of nitric acid manufacture for the entire plant. A store of ammonia liquor is kept in a tank 32 and is pumped by a pump 34 to the liquor source or level tank A, at a rate faster than the rate of use, the excess liquor flowing into an overflow pipe 36 and back to tank 32 or pump 34. The overflow pipe 36 is preferably provided with a tiny aperture 38 at a point slightly below its open top end, so that in the event of complete shut down of the plant, liquor in level tank A may drain to a slightly lower level so as to prevent discharge and spilling of liquor from orifice 22 upon vibration of machinery in the plant, or from other cause. The liquor discharge pipe 26 runs from the discharge chamber 24 to a distributing head or nozzle 40 in the stripping tower B, and preferably includes a liquid seal formed by a U-shaped section 42 in the discharge pipe line 26, to seal the discharge chamber 24 from the stripping tower B. The air blower C and the liquor pump 34 are preferably driven from a common motor 44 or otherwise suitably interlocked so that in the event of stoppage of one of the pumps the other also is stopped, thereby doubly insuring against any abrupt change in the strength of the gas mixture leaving the stripping tower.

The stripping tower B may be of the conventional type including a preferably perforated partition or diaphragm 50, which serves to support a mass of bodies of inert material 52 for dividing the liquor into a plurality of small streams. The excess liquor passes through partition 50 and falls into a reservoir 54 of spent liquor, the level of which is kept constant by an overflow pipe 56.

The air flowing upwardly through stripping tower B, aided by heat supplied to the body of liquid 54 as later described, serves to distill ammonia from the ammonia liquor, and the resulting mixture of ammonia and air passes through the outlet 58 at the top of the stripping tower, from which it is led to the converter D. The compresser K is preferably inserted between the stripping tower B and the converter D to reduce the pressure in the stripping tower, thereby aiding in the distillation of ammonia, and to increase the pressure in the remainder of the system to a value of say 50 pounds per square inch in order to aid the catalytic conversion of the gas mixture and the absorption of the oxidized gas to form the desired acid. Gas chambers 60 and 62 are preferably provided before and after the compressor K in order to smooth out the pressure fluctuations caused by the compressor. A gas filter 64 is preferably inserted in the gas flow circuit ahead of the converter in order to prevent impurities from contaminating the catalyst in the converter.

The compressed and filtered gas mixture is preheated in a heat exchanger E and then fed directly into the converter D. This converter may be of conventional type containing a catalyst such as platinum in mesh or like form, which aids reaction between the air and ammonia and causes ammonia oxidation.

A portion of the heat of reaction is led back to the stripping tower B by means of a jacket 66 surrounding the discharge conduit 68 leading from the converter, the jacket 66 being interconnected by pipes 70 and 72 with the body of liquid 54 at the bottom of the stripping tower. The liquid 54 in the stripping tower and in the jacket 66 is circulated by the thermal syphon action caused by the heating of the liquid in jacket 66. The heat transfer to the stripping tower B undergoes only gradual changes, thereby preventing any sudden volatilization of ammonia in the stripping tower which might damage the catalyst in the converter, and these changes are proportioned to the rate of oxidation of ammonia, that is to say, if the air supply is increased by opening valve 30, not only is the ammonia liquor automatically increased in proportion thereto, but also the heat applied to the stripping tower is somewhat increased due to the increased converter temperature, so that all of the factors involved in the ammonia oxidation process are kept in step.

The reaction gases are somewhat cooled in the heat exchanger E and thereafter are further cooled in the air cooled coils or condenser F, the cooled gas and already liquefied condensate being separated at the point 74.

The nitrogen oxides are finally absorbed to the desired strength in a multiple drum absorption system G, consisting of a plurality of drums 76, 78, 80, 82, and 84, over which a stream of cooling water is constantly spread from distributing pipes 86.

The cooled reaction gas from cooler F is led by pipe 88 to drum 84, the gas being discharged from a perforated pipe 90 immersed beneath the level of the acid in drum 84. Part of the gas is absorbed, thereby strengthening the acid, and the remainder of the gas, which bubbles through the acid, rises through pipe 92 and is similarly discharged or bubbled through the liquid in drum 82. The excess gas is led by a pipe 94 to drum 80 where it is bubbled through the liquid therein, and partially absorbed, the excess being led to drum 78 through pipe 96, and the excess in drum 78 being led through pipe 98 to the liquid in drum 76. The capacity of the drum absorption system is designed so that the gas is capable of being fully absorbed after traversing the entire system of drums.

Condensate from cooler F separated at 74 is led through a pipe 100 to drum 76, from which liquid is led by a pipe 102 to drum 78, from which liquid is led to drum 80 by a pipe 104, and so on to drums 82 and 84, through pipes 106 and 108. The final nitric acid product of desired strength is withdrawn through a pipe 110 and a trap 112 of suitable design. The interconnecting pipes 100, 102, 104, 106, 108, and 110 each are connected to the drums at the proper level for maintaining the desired body of liquid in each of the drums. Each of these interconnecting pipes is also provided with a U-shaped liquid seal or trap, and the gas flow interconnecting pipes 92, 94, 96, and 98 are preferably also provided with inverted U-shaped bends, thereby insuring proper separation of the gas flow and the liquid flow. Drum 76 is provided with a pressure relief valve 114 which serves to maintain the pressure in the absorption system at the desired value against the operation of compressor K, but permits the pressure to be relieved in the event of it's reaching an excessive value.

From the foregoing description it will be clear that by means of my invention the control and operation of an ammonia oxidation or nitric acid manufacturing plant is greatly simplified. The various contributing factors are tied together and automatically inter-related so that by manipulation of a single control valve the rate of manufacture may be varied. It will also be appreciated that in a broader aspect my invention makes possible the automatic regulation or predetermining of the ratio of the rates of flow of any liquid and any gas, which feature of my invention is obviously applicable to numerous processes other than the manufacture of nitric acid.

It will be apparent that while I have shown and described my invention in the preferred form, many changes and modifications may be made in the method and structure disclosed without departing from the spirit of the invention, defined in the following claims.

I claim:

1. The method of controlling the ratio of the rates of flow of a gas and a liquid which includes constricting the gas stream and thereby obtaining a pressure difference on opposite sides of the constriction dependent upon the rate of flow of the gas, circulating the liquid through a first chamber, permitting the liquid to flow from the first to a second chamber, and applying the aforesaid pressure difference to the first chamber in order to promote liquid flow into the second chamber and thereby to control the rate of flow of the liquid from the first to the second chamber, whereby the rate of flow of liquid is automatically varied in response to variations in the rate of flow of the gas.

2. The method of controlling the ratio of the rates of flow of a gas and a liquid which includes separately passing both fluids through orifices, and applying the pressure difference obtained across the gas flow orifice to opposite sides of the liquid flow orifice, in such a way as will cause a flow of liquid through the latter orifice, whereby the rate of flow of the liquid is automatically kept at a value commensurate with the rate of flow of the gas.

3. In the oxidation of ammonia, the method which includes stripping ammonia from a stream of ammonia liquor by the application to said stream of a current of air, constricting the said air current and thereby obtaining a pressure difference on opposite sides of the constriction dependent upon the rate of flow of air, and applying said pressure difference to cause a flow of the ammonia liquor into said current of air to form a mixture, the rate of flow of the stream of ammonia liquor being automatically varied in direct response to the rate of flow of air, and oxidizing said ammonia in said mixture whereby regulation of the air current serves to regulate the rate of ammonia oxidation.

4. In the oxidation of ammonia, the method which includes stripping ammonia from a stream of ammonia liquor by the application to said stream of a current of air, regulating the flow of current of air, constricting the said air current and thereby obtaining a pressure difference on opposite sides of the constriction dependent upon the rate of flow of air, and applying said pressure difference to cause a flow of the ammonia liquor into said current of air to form a mixture, the rate of flow of the ammonia liquor being automatically varied in direct proportion to the rate of flow of air and oxidizing said ammonia in said mixture.

5. In the oxidation of ammonia, the method which includes stripping ammonia from a stream of ammonia liquor by the application to said stream of a current of air, constricting the said air current and thereby obtaining a pressure difference on opposite sides of the constriction dependent upon the rate of flow of air, applying said pressure difference to cause a flow of the ammonia liquor into said current of air to form a mixture, the rate of flow of the stream of ammonia liquor being automatically varied in direct response to the rate of flow of air, catalytically converting the gases in order to oxidize the ammonia, and regulating the current of air to control the rate of oxidation.

6. In the oxidation of ammonia, the method which includes stripping ammonia from a stream of ammonia liquor by the application to said stream of a current of air and heat, regulating the current of air to control the rate of oxidation, constricting the said air current and thereby obtaining a pressure difference on opposite sides of the constriction dependent upon the rate of flow of air, applying said pressure difference to cause a flow of the ammonia liquor, the rate of flow of the ammonia liquor into said current of air to form a mixture being automatically varied in direct response to the rate of flow of air, catalytically converting the gases in order to oxidize the ammonia, and utilizing the resulting heat of reaction from the converter for the stripping of ammonia from the ammonia liquor whereby the heat is automatically regulated in accordance with the rate of oxidation, whereby air regulation does control the rate of oxidation.

7. In the manufacture of nitric acid, the method which includes stripping ammonia from a stream of ammonia liquor by the application to said stream of a current of air and heat, regulating the current of air to control the rate of manufacture of acid, constricting the said air current and thereby obtaining a pressure difference on opposite sides of the constriction dependent upon the rate of flow of air, applying said pressure difference to cause a flow of the ammonia liquor, the rate of flow of the ammonia liquor into said current of air to form a mixture being automatically varied in direct response to the rate of flow of air, catalytically converting the gases in order to oxidize the ammonia, utilizing the resulting heat of reaction from the converter for the stripping of ammonia from the ammonia liquor whereby the heat is automatically regulated in accordance with the rate of oxidation of the ammonia, and cooling and absorbing the oxidized ammonia to form nitric acid, whereby air regulation does control the rate of oxidation.

8. In the manufacture of nitric acid, the method which includes stripping ammonia from a stream of ammonia liquor by the application to said stream of a current of air and heat, regulating the current of air to control the rate of manufacture of acid, constricting the said air current and thereby obtaining a pressure difference on opposite sides of the constriction dependent upon the rate of flow of air, applying said pressure difference to cause a flow of the ammonia liquor, the rate of flow of the ammonia liquor into said current of air to form a mixture being varied in direct response to the rate of flow of air, raising the pressure of the resulting ammonia and air mixture, catalytically converting the gases in order to oxidize the ammonia, utilizing the resulting heat of reaction from the converter for the stripping of ammonia from the ammonia liquor whereby the heat is automatically regulated in accordance with the rate of oxidation of the ammonia, and cooling and absorbing the oxidized ammonia under pressure to form nitric acid, whereby air regulation does control the rate of oxidation.

9. An arrangement for automatically regulating the ratio of the rates of flow of a gas and a liquid comprising a gas conduit, an orifice in said conduit, an enclosed constant level tank for the liquid, a discharge outlet therefrom and means to apply the pressure difference across the orifice to the enclosed liquid in the constant level tank in order to vary the rate of flow of liquid therefrom through the discharge outlet.

10. An arrangement for automatically regulating the ratio of the rates of flow of a gas and a liquid comprising a gas conduit, an orifice in said conduit, a supply tank for the liquid, a conduit leading therefrom, an orifice in said conduit, and means to apply the high and low pressures across the gas flow orifice respectively to the supply tank and to the opposite side of the liquid flow orifice, in order to vary the rate of flow of liquid therethrough.

11. An arrangement for the oxidation of ammonia comprising a supply tank for ammonia liquor, a stripping tower for stripping ammonia from the liquor by the application of a current of air and heat, an air conduit leading to said tower, means to regulate the current of air therethrough in order to control the rate of oxidation, an orifice in said conduit to develop a pressure difference thereacross dependent upon the rate of flow of air therethrough, means responsive to said pressure difference to automatically vary the effective pressure superimposed on and consequently the rate of flow of the ammonia liquor, a catalytic converter for oxidizing the ammonia, and means to apply the resulting heat of reaction to the stripping tower so that the heat is automatically regulated in accordance with the rate of oxidation.

12. An arrangement for the manufacture of nitric acid comprising a tank of ammonia liquor, an air blower, a stripping tower for stripping ammonia from the ammonia liquor, a conduit including a regulating valve leading from said air blower to said stripping tower, a conduit leading from said tank of ammonia liquor to said stripping tower, an orifice in each of said conduits, means responsive to the pressure difference across the orifice in the air conduit for automatically varying the effective supply pressure across the other orifice, a catalytic converter for oxidizing the ammonia, and means to cool and absorb the oxidized ammonia to form nitric acid.

13. An arrangement for the manufacture of nitric acid comprising a tank of ammonia liquor, an air blower, a stripping tower for stripping ammonia from the ammonia liquor, a conduit including a regulating valve leading from said air blower to said stripping tower, a conduit leading from said tank of ammonia liquor to said stripping tower, an orifice in each of said conduits, means responsive to the pressure difference across the orifice in the air conduit for automatically varying the effective supply pressure across the other orifice, a catalytic converter for oxidizing the ammonia, and a drum absorption system to cool and absorb the oxidized ammonia to form nitric acid.

14. An arrangement for the manufacture of nitric acid comprising a tank of ammonia liquor, an air blower, a stripping tower for stripping ammonia from the ammonia liquor, a conduit including a regulating valve leading from said air blower to said stripping tower, a conduit leading from said tank of ammonia liquor to said stripping tower, an orifice in each of said conduits, means responsive to the pressure difference across the orifice in the air conduit for automatically varying the effective supply pressure across the other orifice, a catalytic converter for oxidizing the ammonia, a compressor between the stripping tower and the converter for reducing the pressure in the stripping tower and raising the pressure in the remainder of the system, and means to cool and absorb the oxidized ammonia under pressure to form nitric acid.

15. An arrangement for the manufacture of nitric acid comprising a tank of ammonia liquor, an air blower, a stripping tower for stripping ammonia from the ammonia liquor, a conduit including a regulating valve leading from said air blower to said stripping tower, a conduit leading from said tank of ammonia liquor to said stripping tower, an orifice in each of said conduits, means responsive to the pressure difference across the orifice in the air conduit for automatically varying the effective supply pressure across the other orifice, a catalytic converter for oxidizing the ammonia, means to transfer the heat of reaction from the converter to the stripping tower so that the heat is automatically regulated in accordance with the rate of oxidation of the ammonia, and means to cool and absorb the oxidized ammonia to form nitric acid.

16. An arrangement for the manufacture of nitric acid comprising a tank of ammonia liquor, an air blower, a stripping tower for stripping ammonia from the ammonia liquor, a conduit including a regulating valve leading from said air blower to said stripping tower, a conduit leading from said tank of ammonia liquor to said stripping tower, an orifice in each of said conduits, means responsive to the pressure difference across the orifice in the air conduit for automatically varying the effective supply pressure across the other orifice, a catalytic converter for oxidizing the ammonia, a compressor between the stripping tower and the converter for reducing the pressure in the stripping tower and raising the pressure in the remainder of the system, means to transfer the heat of reaction from the converter to the stripping tower so that the heat is automatically regulated in accordance with the rate of oxidation of the ammonia, and means to cool and absorb the oxidized ammonia under pressure to form nitric acid.

17. An arrangement for controlling the ratio of the rates of flow of a gas and a liquid comprising a reservoir for the liquid, means for maintaining the level of the liquid therein constant, a conduit leading from the reservoir and including an orifice located at the level of the liquid in the reservoir, a gas flow conduit, an orifice in said gas flow conduit, and means to apply the pressures on opposite sides of the gas flow orifice to opposite sides of the liquid flow orifice, whereby the flow of liquid through the liquid flow orifice is varied in response to the rate of flow of the gas.

18. An arrangement for controlling the ratio of the rates of flow of a gas and a liquid comprising a reservoir for the liquid, means for maintaining the level of the liquid therein constant, a discharge chamber, a conduit leading from the reservoir into the discharge chamber and including an orifice located in the discharge chamber at the level of the liquid in the reservoir, a gas flow conduit, an orifice in said gas flow conduit, and means to apply the pressures before and after the gas flow orifice to the reservoir and discharge chamber respectively, whereby the rate of flow of liquid through the liquid flow orifice is kept in proportion to the rate of flow of the gas.

19. An arrangement for controlling the ratio of the rates of flow of a gas and a liquid comprising an elevated reservoir for the liquid, a main supply tank for the liquid, a pump for pumping liquid from the supply tank to said reservoir, an overflow pipe in said reservoir for maintaining the level of the liquid therein constant, a discharge chamber, a conduit leading from the reservoir into the discharge chamber and including an orifice located in the discharge chamber at the level of the liquid in the reservoir, a gas flow conduit, an orifice in said gas flow conduit, and means to apply the pressures before and after the gas flow orifice to the reservoir and discharge chamber respectively, whereby the effective pressure across and consequently the flow of liquid through the liquid flow orifice is varied in response to the rate of flow of the gas.

20. An arrangement for controlling the ratio of the rates of flow of a gas and a liquid comprising an elevated reservoir for the liquid, a main supply tank for the liquid, a pump for pumping liquid from the supply tank to said reservoir, an overflow pipe in said reservoir for maintaining the level of the liquid therein constant, a discharge chamber, a conduit leading from the reservoir into the discharge chamber and including an orifice located in the discharge chamber at the level of the liquid in the reservoir, a gas flow conduit, an orifice in said gas flow conduit, means to pump gas through said gas flow conduit, means to apply the pressures before and after the gas flow orifice to the reservoir and discharge chamber respectively, whereby the effective pressure across and consequently the flow of liquid through the liquid flow orifice is varied in response to the rate of flow of the gas, and means to stop the liquid pump upon stoppage of the gas pump.

21. The method of controlling the ratio of the rates of flow of a gas and a liquid which includes separately passing both fluids through orifices, and applying the pressure difference obtained across the gas flow orifice to opposite sides of the liquid flow orifice in such a way as will cause a flow of liquid through the latter orifice, whereby the flow of the liquid is caused to vary in direct relation to variation in the flow of gas.

22. In apparatus for injecting a liquid into a gas, the combination of a pipe line for conducting the gas, restricting means for restricting the flow of the gas at a point in the pipe line to cause a differential of static pressure in the line before and beyond the location of the restricting means, a closed container for holding a bath of the liquid, a connection from the pipe line at a point before the restricting means leading into the said container for subjecting the surface of the liquid to the pipe line pressure, said container having a feed outlet below the level of the bath, means for effecting a restricted feed of the liquid from the bath, a feed device for receiving the liquid fed forward from the bath and having its delivery opening located at or about the level of the bath in said container, and means for connecting the feed device with the pipe line beyond said restricting means.

NICOLAY TITLESTAD.